US006990485B2

(12) United States Patent
Forman et al.

(10) Patent No.: US 6,990,485 B2
(45) Date of Patent: Jan. 24, 2006

(54) SYSTEM AND METHOD FOR INDUCING A TOP-DOWN HIERARCHICAL CATEGORIZER

(75) Inventors: George H. Forman, Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 583 days.

(21) Appl. No.: 10/211,840

(22) Filed: Aug. 2, 2002

(65) Prior Publication Data

US 2004/0024769 A1    Feb. 5, 2004

(51) Int. Cl.
*G06F 17/30*    (2006.01)
(52) U.S. Cl. .................................................. 707/5
(58) Field of Classification Search .............. 707/1–10, 707/100–104.1, 200–206
See application file for complete search history.

(56) References Cited

U.S. PATENT DOCUMENTS

| | | | |
|---|---|---|---|
| 5,627,980 A * | 5/1997 | Schilit et al. ................ 715/841 |
| 5,694,524 A | 12/1997 | Evans | |
| 5,781,698 A | 7/1998 | Teller et al. | |
| 5,796,863 A | 8/1998 | Lyon | |
| 5,930,803 A | 7/1999 | Becker et al. | |
| 5,999,893 A | 12/1999 | Lynch, Jr. et al. | |
| 6,006,225 A * | 12/1999 | Bowman et al. ................ 707/5 |
| 6,026,399 A | 2/2000 | Kohavi et al. | |
| 6,178,416 B1 * | 1/2001 | Thompson et al. ............. 707/3 |
| 6,182,058 B1 | 1/2001 | Kohavi | |
| 6,233,575 B1 | 5/2001 | Agrawal et al. | |
| 6,430,558 B1 * | 8/2002 | Delano ............................ 707/5 |
| 6,489,968 B1 * | 12/2002 | Ortega et al. ................ 715/713 |
| 6,516,308 B1 * | 2/2003 | Cohen ............................ 706/12 |

OTHER PUBLICATIONS

Drucker et al., Support Vector Machines for Spam Categorization, IEEE Transactions on Neural Drucker et al., Support Vector Machines for Spam Categorization, IEEE Transactions on Neural Networks, Sep. 1999 vol. 10, No. 5, pp. 1048-1054.*
Sasaki et al., Rule-Based Text Categorization Using Hierarchical Categories , 1998, IEEE International Conference on System Man and Cybernetics, Oct. 1998, vol. 3, pp. 2827-2830.*
George Forman, A method for Discovering the Insignificance of One's Best Classifier and the Unlearnability of a Classification Task, Jul. 9, 2002, Data Mining Lessons Workshop at Intern. Confer. on Learning, Hewlett Packard Labs, pp. 1-5.*
Soumen Chakrabarti et al., Scalable feature selection, classification, and signature generation for organizing large text databases into hierarchical topic taxonomies, 1998, Spring-Verlag New York, Inc. vol. 7, Issue 3, pp. 163-178.*

(Continued)

*Primary Examiner*—Diane Mizrahi

(57) ABSTRACT

A method of inducing a top-down hierarchical categorizer includes providing a set of labeled training items. Each labeled training item includes an associated label representing a single category assignment for the training item. A set of unlabeled training items is provided. A prior is associated with the set of unlabeled training items that is independent of any particular feature contained in the unlabeled training items. The prior represents a plurality of possible category assignments for the set of unlabeled training items. A top-down hierarchical categorizer is induced with a machine learning algorithm based on the set of labeled training items, the set of unlabeled training items, and the prior.

29 Claims, 6 Drawing Sheets

OTHER PUBLICATIONS

Fabrizio Sebastiani, Machine Learning in automated text categorization, Mar. 2002, ACM Press, vol. 34, Issue 1, pp. 1-47.*

Susan Dumais et al., Hierarchical classification of Web content, 2002, ACM Press, pp. 256-263.*

Paul N. Bennett et al., Using asymmetric distributions to improve text classifier probability estimates, 2003, ACM Press, pp. 11 118.*

Elana Baralis et al, Essential classification rule sets, Dec. 2004, ACP Press, vol. 29, Issue 4, pp. 635-674.*

Dimitris, Meretakis et al. , Extending naive classifiers using long interests, 1999, ACM Press, pp. 165-174.*

University of Waikato webpage, "http://www.cs.waikato.ac.nz/ml/publications.html", Eibe Frank, Chang Chui, and Ian H. Witten, Department of Computer Science, University of Waikato, Hamilton, New Zealand, "Text Categorization Using Compression Models", 10 pgs.

HP Website, "http://www.hpl.hp.com/org/stl/dmsd", HP Software Technology Lab: Data Mining Research, 5 pgs.

* cited by examiner

SYSTEM AND METHOD FOR INDUCING A TOP-DOWN HIERARCHICAL CATEGORIZER

THE FIELD OF THE INVENTION

The present invention relates to categorization systems and more particularly to a system and method for inducing a top-down hierarchical categorizer.

BACKGROUND OF THE INVENTION

Categorization involves assigning items (e.g., documents, products, patients, etc.) into categories based on features of the items (e.g., which words appear in a document), and possibly subject to a degree of confidence. For example: vehicle X that has the features ---
number of seats = 55
color = yellow
--- belongs to the category "school buses" with probability 95%.

Hierarchical categorization is the problem of categorizing where the categories are organized in a hierarchy. The field's terminology has a number of common synonyms, such as:

---
categorization = classification, prediction
features = attributes, properties
categories = classes, subtopics
confidence = degree of belief, certainty
items = cases, examples
machine learning = supervised learning, induction
---

In the past, many different systems have been developed for categorizing different types of items. The earliest systems used manual assignment of documents to categories, for example, by human experts. This is currently the dominant method, which is used in libraries, as well as by popular Internet search engine companies.

Disadvantages of manual assignment include the fact that it requires a large amount of human resources and it is labor-intensive. In addition, manual assignment is somewhat error-prone and may lead to inconsistencies if people are assigning documents to categories based on different criteria, different interpretations of criteria, or different levels of expertise.

To be less subjective, rule-based assignment of documents to categories, including rules based on keywords, has been developed for use with computer systems. This approach uses rules such as "if the document contains the words 'football', and 'goal', and 'umpire' and not the word 'national' then assign it to the category 'local football.'"

Mostly, human domain experts author these rules, possibly with the aid of keyword identification tools (such as word counters). These rules usually are comprised of Boolean combinations of keyword occurrences (possibly modified by counts such as "if the term 'national' is used at least 5 times then assign to 'national baseball'"). These rules can be executed automatically, so this solution can be used to automatically assign documents to categories. Examples of human-authored rule classifier systems include a topics search engine by Verity Corp., and email routing software by Kana Communications Inc.

The disadvantages of rule-based assignment are that the accuracy of these rules is often very poor. Depending on the authoring of the rules, either the same document is assigned to many categories, including many wrong categories, or to too few categories, in which case documents do not appear in the categories they should. Another disadvantage is that the rules are difficult to author and maintain, and the interaction of the rules (so-called "chaining") is difficult to understand (and debug), so that unexpected assignments of documents to categories may occur.

Categorizers may be built manually by people authoring rules/heuristics, or else built automatically via machine learning, wherein categorizers are induced based on a large training set of items. Each item in the training set is typically labeled with its correct category assignment. The use of predefined categories implies a supervised learning approach to categorization, where already-categorized items are used as training data to build a model for categorizing new items. Appropriate labels can then be assigned automatically by the model to new, unlabeled items depending on which category they fall into. Typically, the larger the training set, the better the categorization accuracy. However, it typically costs something (e.g., human labeling effort) to prepare the training set.

Examples of machine learning algorithms include the well-known Naïve Bayes and C4.5 algorithms, support vector machines, and commercial offerings such as those of Autonomy Inc., and Moho Mine Inc.

One type of categorizer that can be induced by such machine learning algorithms is a top-down hierarchical categorizer (also referred to as a Pachinko classifier). A top-down hierarchical categorizer typically considers a topic hierarchy one level at a time. At each level, there are typically one or more categorizers that, when assigned a document, pick a category at the next level based on features of the document.

A major barrier to using machine-learning categorization technology is that it requires a significant amount of training data, the gathering of which involves significant costs, delays and/or human labor.

SUMMARY OF THE INVENTION

One form of the present invention provides a method of inducing a top-down hierarchical categorizer. A set of labeled training items is provided. Each labeled training item includes an associated label representing a single category assignment for the training item. A set of unlabeled training items is provided. A prior is associated with the set of unlabeled training items that is independent of any particular feature contained in the unlabeled training items. The prior represents a plurality of possible category assignments for the set of unlabeled training items. A top-down hierarchical categorizer is induced with a machine learning algorithm based on the set of labeled training items, the set of unlabeled training items, and the prior.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
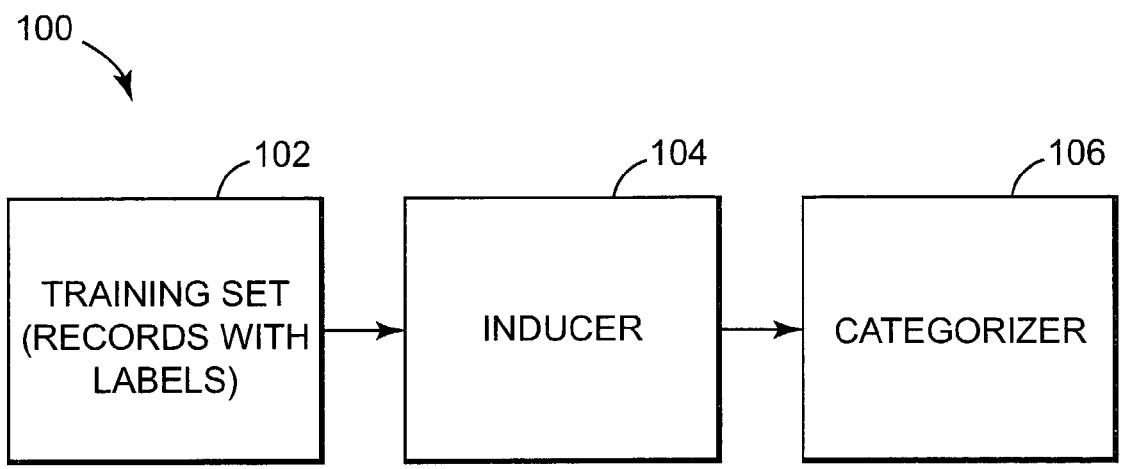
FIG. 1 is a block diagram illustrating a prior art system for inducing a categorizer from a training set of labeled records.

FIG. 1 is a diagram illustrating a prior art system 100 for inducing/training a categorizer 106 from a training set 102 of labeled records. Each record in training set 102 is labeled with its correct category assignment. Inducer 104 receives the training set 102 and constructs the categorizer 106 using a machine learning algorithm.

Figure 2:
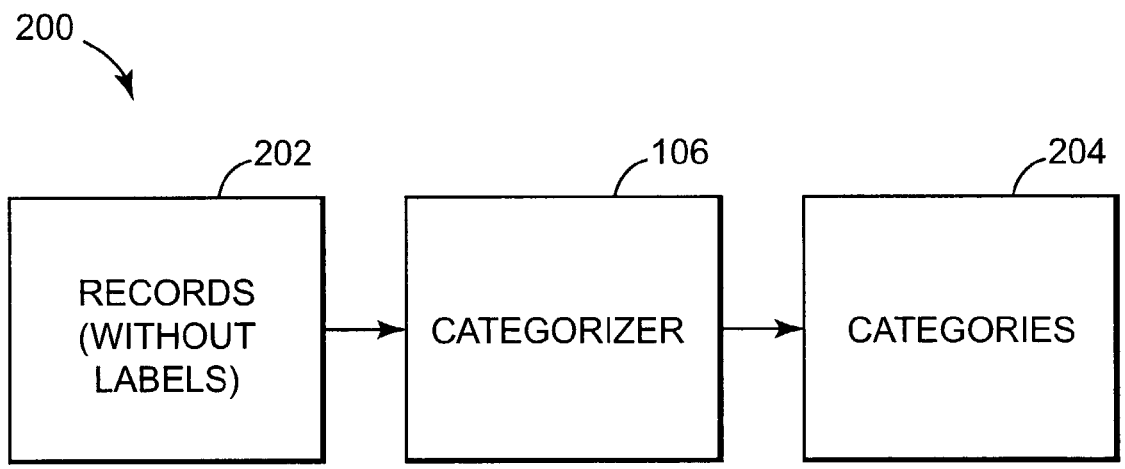
FIG. 2 is a block diagram illustrating a prior art system for categorizing unlabeled records with a categorizer that has been induced as shown in FIG. 1.

FIG. 2 is a diagram illustrating a prior art system 200 for categorizing unlabeled records 202 with a categorizer 106 that has been induced as shown in FIG. 1. System 200 includes records without labels (unlabeled records) 202, categorizer 106 and categories 204. Categorizer 106 receives unlabeled records 202 and categorizes the unlabeled records 202 as belonging to one of the categories 204.

One type of categorizer 106 that may be induced by machine learning algorithms is a top-down hierarchical categorizer. As shown in FIG. 1, such a categorizer may be induced based on a training set 102 of records, with each record labeled with its correct category assignment. One form of the present invention reduces the need to obtain such labeled training data for a top-down hierarchical categorizer, where certain other "prior" information is more easily available. In this context, a "prior" for a document, according to one embodiment, indicates that a document's correct categorization falls within a certain set of possible categories, whereas the document's "label" names a single correct category assignment for the document. As described below, in one embodiment, the training set is augmented with documents for which a prior is known, where labels are unavailable for such documents.

Figure 3:
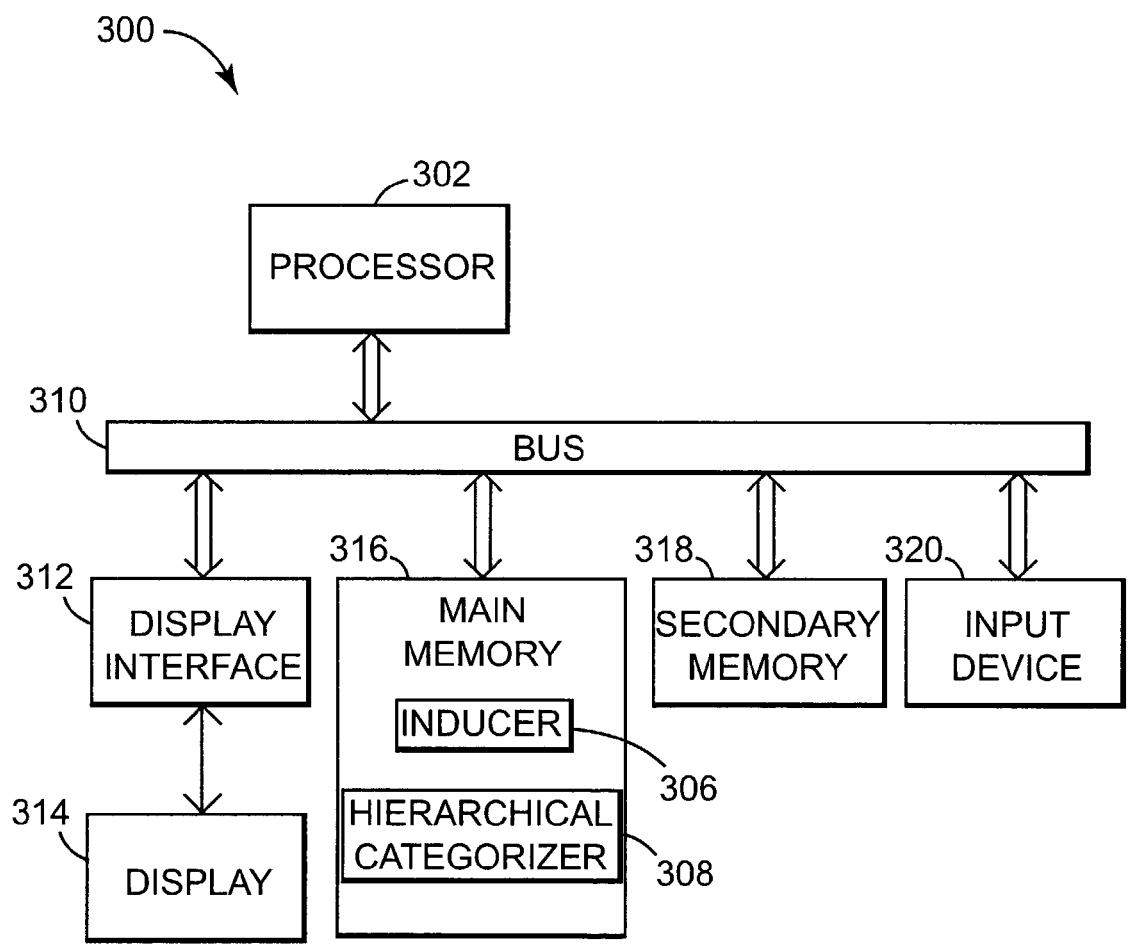
FIG. 3 is an electrical block diagram of a computer system configured to implement one embodiment of the present invention.

FIG. 3 is an electrical block diagram of a computer system 300 configured to implement one embodiment of the present invention. Computer system 300 includes processor 302, bus 310, display interface 312, display 314, main memory 316, secondary memory 318, and input device 320.

Processor 302 is coupled to display interface 312, main memory 316, secondary memory 318, and input device 320 via bus 310. Display interface 312 is coupled to display 314. Main memory 316 stores data, and application program instructions for execution by processor 302. In one embodiment, secondary memory 318 includes a disk drive, CD-ROM drive, and/or other non-volatile storage systems. An input device 320, such as a keyboard, allows a user to enter data and otherwise interact with system 300.

As shown in FIG. 3, an inducer module 306 and a hierarchical categorizer module 308 are stored in main memory 316. In operation according to one embodiment, processor 302 executes inducer module 306, which induces top-down hierarchical categorizer 308 based on training items with labels 402A (shown in FIG. 4) and based on training items with priors 402B (shown in FIG. 4), as described in further detail below. Processor 302 executes the induced hierarchical categorizer 308 to categorize a set of unlabeled items.

It will be understood by a person of ordinary skill in the art that functions performed by system 300 may be implemented in hardware, software, firmware, or any combination thereof. The implementation may be via a microprocessor, programmable logic device, or state machine. Components of embodiments of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

In one embodiment, items to be categorized by top-down hierarchical categorizer 308 comprise documents, such as electronic documents accessible on the Internet. However, it will be understood that further embodiments of the invention are applicable to other types of items and other network architectures (e.g., client/server, local, intermediate or wide area networks), dedicated database environments, or other configurations.

Figure 4:
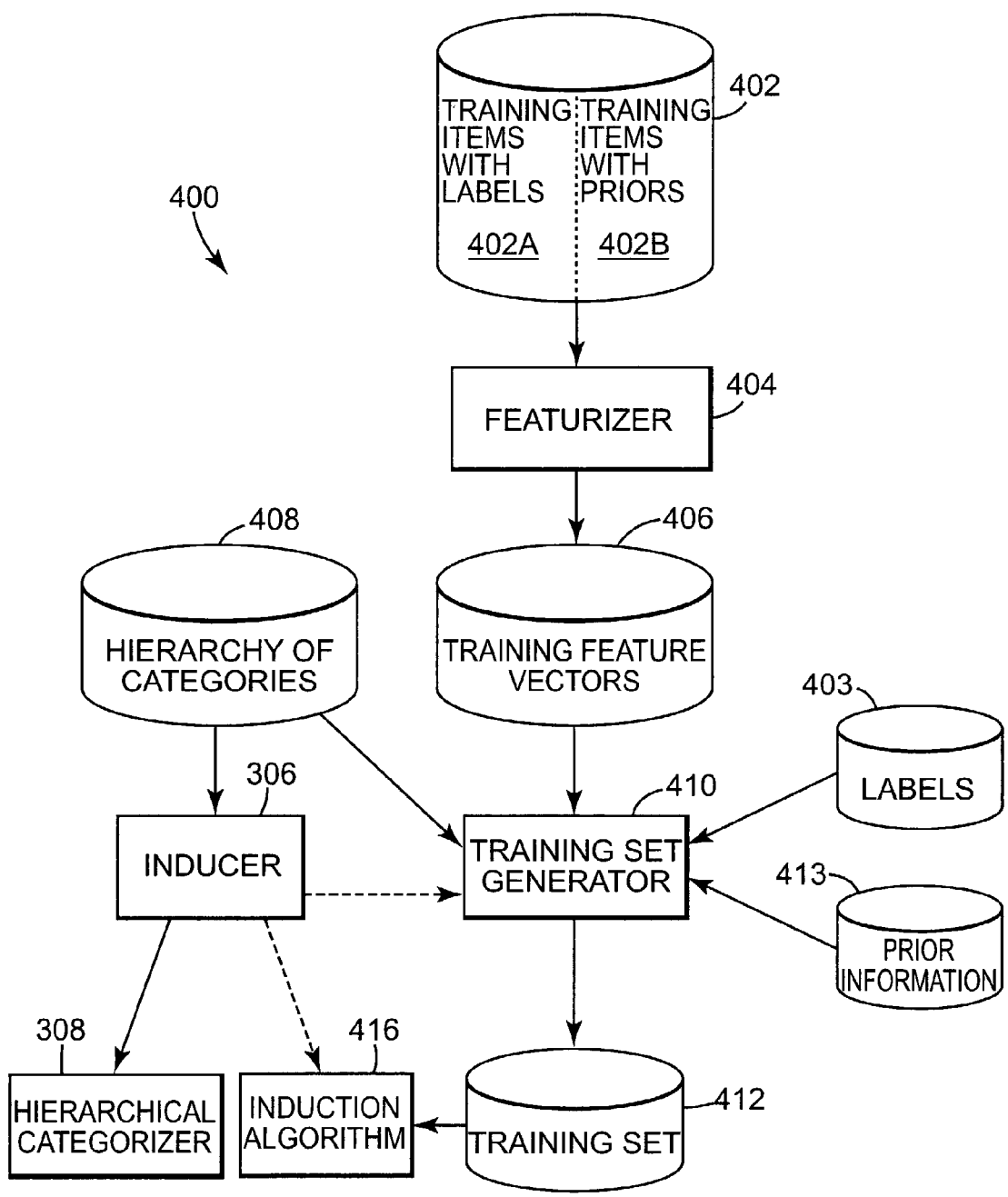
FIG. 4 is a block diagram illustrating a system for inducing a top-down hierarchical categorizer using prior information according to one embodiment of the present invention.

FIG. 4 is a block diagram illustrating a system 400 for inducing a top-down hierarchical categorizer 308 using prior information according to one embodiment of the present invention. System 400 includes hierarchy of categories 408, inducer 306, top-down hierarchical categorizer 308, induction algorithm 416, training items 402, featurizer 404, training feature vectors 406, training set generator 410, training set 412, labels 403, and prior information 413.

Training items 402 include training items with labels 402A and training items with priors 402B. In one embodiment, training items 402 are simply raw documents that do not include associated labels or priors, and labels and priors are associated with the documents after the documents have been featurized. In one embodiment, featurizer 404 produces a feature vector for each training item in training items 402. The set of feature vectors generated for training items 402 is referred to as training feature vectors 406.

The training feature vectors 406 are provided to training set generator 410. Training set generator 410 also receives hierarchy of categories 408, labels 403, and prior information 413. Based on these inputs, training set generator 410 generates a training set 412 that includes a plurality of feature vectors, with each feature vector having an associated label 403 or prior information 413.

According to one embodiment of the present invention, the hierarchy of categories 408 is provided by a user. The hierarchy 408 represents a "tree" of categories that has "branches" that end at "leaves". The leaves are the places in the hierarchy where there are no further subdivisions under a given category.

In one embodiment, labels 403 are implemented as a table that specifies category assignments for training items 402A (e.g., document 1023812 is assigned to category A12, document 1023813 is assigned to category B11, etc.), and each training item in training items 402A has a single category from the hierarchy of categories 408 associated with the item (i.e., the item's "label" 403).

Figure 6A:
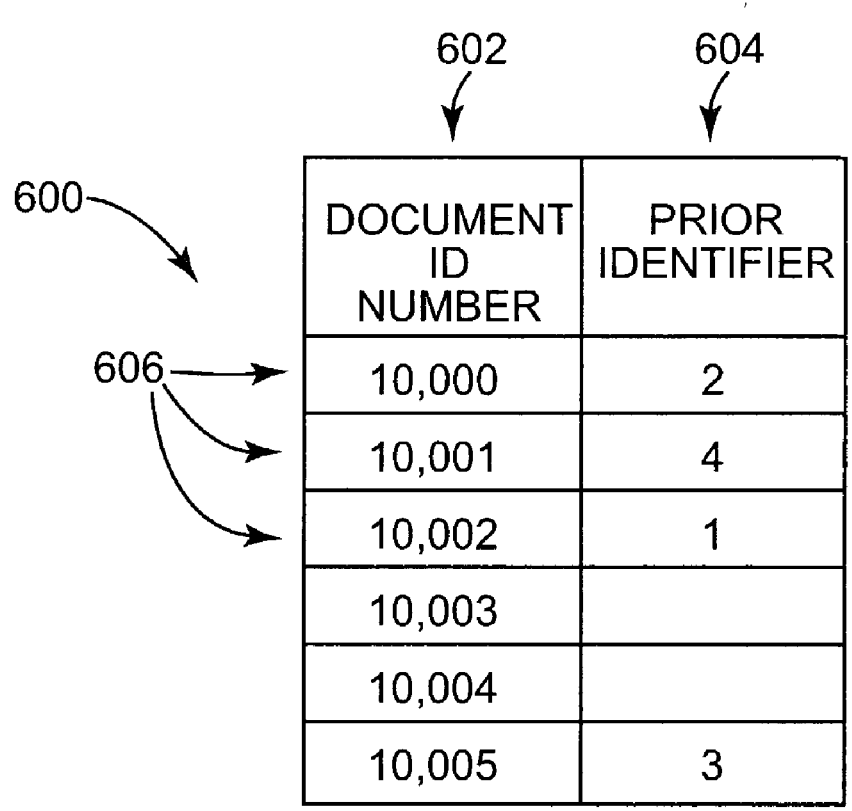
FIG. 6A is a diagram of a table illustrating an association between training documents and prior identifiers according to one embodiment of the present invention.
Figure 6B:
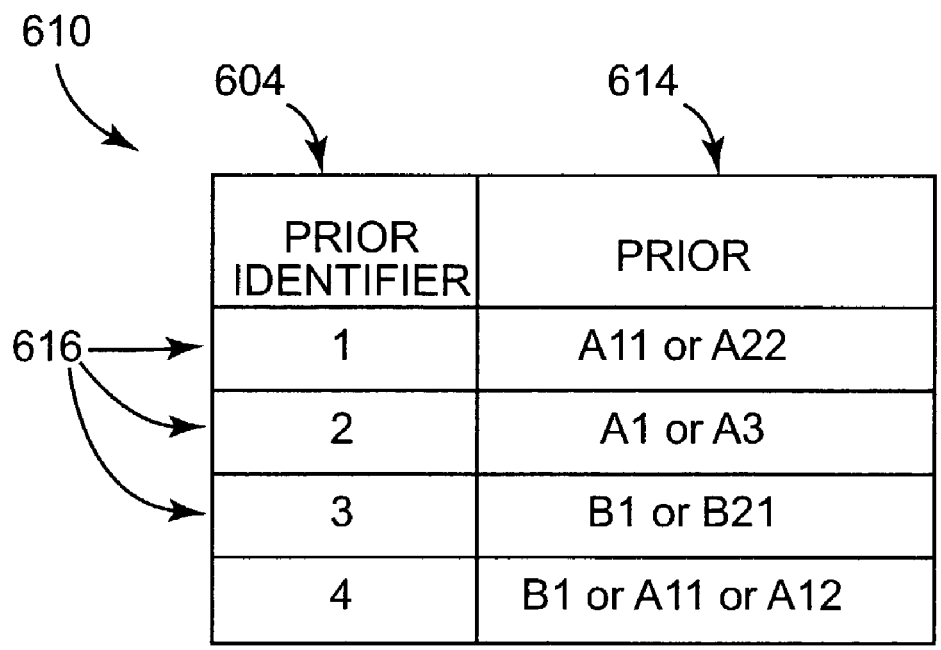
FIG. 6B is a diagram of a table illustrating an association between prior identifiers and priors according to one embodiment of the present invention.

In one embodiment, prior information 413 is implemented as one or more tables that specify for each training item in training items 402B a set of possible categories from the hierarchy of categories 408 for the item (e.g., document 1023814 is assigned to one of categories A11 or A12, document 1023815 is assigned to one of categories A11, A21, or A22, etc.). One embodiment of prior information 413 is illustrated in FIGS. 6A and 6B and is described in further detail below with reference to those Figures.

In one form of the invention, inducer 306 repeatedly calls induction algorithm 416 and training set generator 410 as represented by the dotted arrows in FIG. 4. In one embodiment, for each call, training set generator 410 generates an appropriate training set 412 based on training feature vectors 406, labels 403, prior information 413, and hierarchy of categories 408. In one form of the invention, for each call, the training set 412 generated by training set generator 410 includes labels 403 and prior information 413 that are appropriately mapped to essentially provide an all-labeled training set for the place in the hierarchy 408 currently under consideration, as described in further detail below. The generated training sets 412 are used by induction algorithm 416 to induce categorizers for hierarchical categorizer 308. In one embodiment, induction algorithm 416 may be any general-purpose induction algorithm, such as Naïve Bayes, Support Vector Machines, k-Nearest Neighbors, Neural Networks, or C4.5.

In one embodiment, system 400 is implemented as one or more software modules executable by computer system 300 (shown in FIG. 3), and appropriate input information (e.g., training items 402, hierarchy of categories 408, labels 403, and prior information 413) is provided to computer system 300 via input device 320, secondary memory 318, or via some other input mechanism.

Figure 5:
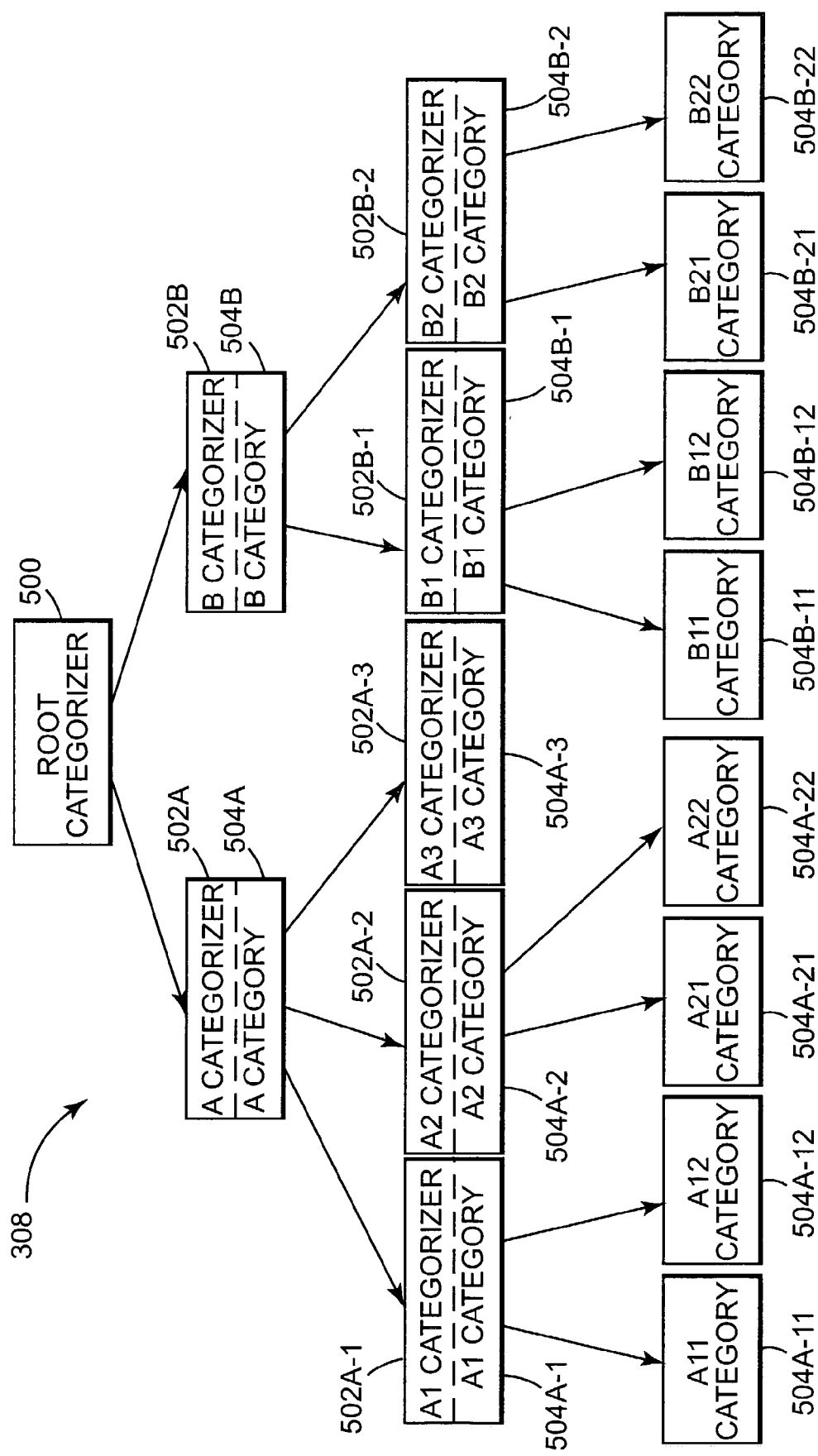
FIG. 5 is a hierarchical tree diagram representing a top-down hierarchical categorizer that is induced using prior information according to one embodiment of the present invention.

FIG. 5 is a hierarchical tree diagram representing a hierarchical categorizer 308 according to one embodiment of the present invention. Hierarchical categorizer 308 includes a top or root categorizer 500, and seven sub-categorizers 502A, 502B, 502A-1, 502A-2, 502A-3, 502B-1, and 502B-2 (collectively referred to as sub-categorizers 502) under the top categorizer 500. Sub-categorizers 502A, 502B, 502A-1, 502A-2, 502A-3, 502B-1, and 502B-2, include categories 504A, 504B, 504A-1, 504A-2, 504A-3, 504B-1, and 504B-2, respectively. Hierarchical categorizer 308 may be considered a "tree" having a "root" at the top categorizer 500 and branches to the various sub-categorizers 502. At the bottom of hierarchical categorizer 308 are "leaves," which include categories 504A-11, 504A-12, 504A-21, 504A-22, 504B-11, 504B-12, 504B-21, and 504B-22. Categories 504A, 504B, 504A-1, 504A-2, 504A-3, 504B-1, 504B-2, 504A-11, 504A-12, 504A-21, 504A-22, 504B-11, 504B-12, 504B-21, and 504B-22, are collectively referred to herein as categories 504. The categories 504 correspond to the hierarchy of categories 408 (shown in FIG. 4).

During categorization according to one embodiment, hierarchical categorizer 308 works top-down. Top categorizer 500 chooses which of the two branch paths below it to follow, and each sub-categorizer 502 selects which local branch path below that sub-categorizer 502 to follow. Further sub-categorizers 502 would be added for more complex categorization systems. Each sub-categorizer 502 represents the beginning of a "subtree." The hierarchical categorizer 308 shown in FIG. 5 is provided as one example for purposes of simplifying the present disclosure and is not intended to limit the invention to the specific illustration of the categorizer 308.

In one embodiment, when training each sub-categorizer 502, all of the training items with labels 402A that fall within the subtree of that sub-categorizer 502 have their labels temporarily mapped to the (smaller) set of branch choices directly below that sub-categorizer 502. For example, during training of sub-categorizer 502A, training items 402A having labels corresponding to category 504A-11 or 504A-12 would be temporarily mapped to category 504A-1, and would be training examples for category 504A-1. Similarly, training items 402A having labels corresponding to category 504A-21 or 504A-22 would be temporarily mapped to category 504A-2. The induction algorithm 416 looks at the features of each training item and the category that the training item belongs in, and essentially determines what the pattern of features is that puts the training item in that category.

In one form of the invention, a "prior" for a document indicates that the document's correct categorization falls somewhere within a certain set of categories, whereas the document's label names a single correct category assignment for the document.

For example, assume that books are being categorized into dozens of categories. Assume that category 504A in FIG. 5 is "fiction" and category 504B is "non-fiction," and that the categories 504 below category 504A specify fiction topics, and the categories below category 504B specify non-fiction topics. If it is known that books from a particular technical publisher (e.g., Publisher X) are non-fiction (i.e., we have a prior that books from Publisher X belong in any of the non-fiction topics, but not the fiction topics), all of these books can be used to augment the training set, even if they do not have associated labels for their specific categories. Thus, when training the top categorizer 500 to choose between categories 504A and 504B, all of the books from Publisher X can be used as training examples for category 504B, even if a label identifying a specific category has never been assigned to these books. Therefore, the number of training examples for the top categorizer 500 has been increased, with relatively small added cost (i.e., a human does not have to look at each book and assign a label). The documents under this particular prior are essentially as good as labeled documents when training the root categorizer 500, but in one embodiment, are not used in further categorization at lower levels in the hierarchy. In this embodiment, for further categorization (e.g., choosing between category 504B-1 or 504B-2), manually labeled training cases would be used as well as any unlabeled cases with priors that fall within these two subtrees. Likewise, if publisher Y produces only books that fall under category 504A-1 (e.g., technical manuals), these cases can be used in training both the root categorizer 500 and the categorizer 502A. More generally, items with priors contained under a given node can be used in training all categorizers that are ancestors of that node.

FIGS. 6A and 6B illustrate one embodiment of prior information 413 (shown in FIG. 4). FIG. 6A is a diagram of a table 600 illustrating an association between training documents and prior identifiers according to one embodiment of the present invention. Table 600 includes columns 602 and 604, and a plurality of entries 606. Column 602 includes a plurality of document ID numbers for documents in the training set, and column 604 includes a plurality of prior identifiers. Each entry 606 provides an association between a document ID number (in column 602) and a prior identifier (in column 604). In one embodiment, each document to be used for training is assigned a document ID number, and the number is entered in table 600. If a document to be used for training includes a known prior, a prior identifier 604 for that prior is entered in the table 600 for that document. In one embodiment, not all documents to be used for training will have a known prior, but they should then have labels to be useful for training. For example, the documents represented by document ID numbers 10,003 and 10,004 do not include an associated prior identifier 604 in table 600.

FIG. 6B is a diagram of a table 610 illustrating an association between prior identifiers and priors according to one embodiment of the present invention. Table 610 includes columns 604 and 614, and a plurality of entries 616. Column 604 includes a plurality of prior identifiers, and column 614 includes a plurality of priors. Each entry 616 provides an association between a prior identifier (in column 604) and a prior (in column 614).

In one embodiment, prior information in tables 600 and 610 is accessed and used during training of hierarchical categorizer 308. Table 600 is accessed to determine if a document (represented by its document ID number 602) includes an associated prior identifier 604. If the document does have an associated prior identifier 604, table 610 is accessed to identify the prior 614 associated with the prior identifier 604. The identified prior 614 indicates possible categories 504 that the document under consideration might fall under. For example, the first prior 614 listed in table 610 is "A11 or A22" which represents category 504A-11 or 504A-22 in FIG. 5. Thus, any document identified in table 600 that has a prior identifier 604 of "1" will fall under either category 504A-11 or 504A-22. Similarly, documents with a prior identifier 604 of "2" will fall under either category 504A-1 or 504A-3, documents with a prior identifier 604 of "3" will fall under either category 504B-1 or 504B-21, and documents with a prior identifier 604 of "4" will fall under one of categories 504B-1, 504A-11, or 504A-12. In an alternate embodiment, each prior 614 explicitly lists every single possible category for the item (e.g., instead of just listing "A1", the prior would list "A1 or A11 or A12"). This more powerful representation allows for specifying that a set of items may fall anywhere under A except A11.

In one embodiment, prior information is manually entered and associated with training documents as the documents are entered into the system for training. This typically involves far less effort than assigning a specific label to each case. For example, if a set of 15,000 documents are received from Company X, and it is known that documents from Company X all have a prior identifier 604 of "1," then a human operator can easily associate this prior information with all 15,000 documents at one time. In contrast, to go through each one of the 15,000 documents individually and assign a specific label would take a much larger amount of time and human resources.

For the purposes of obtaining the most leverage from the priors 614, in one embodiment, the hierarchy 408 is preferably organized in such a way that most training items' priors 614 have all of their possible categories 504 falling within a single subtree of the hierarchy 408, as small as possible. For example, if many training items 402B come with a prior 614 that specifies various non-fiction categories 504, the non-fiction categories 504 would preferably be gathered into one small subtree (e.g., the subtree beginning at category 504B-2), rather than having these categories 504 spread randomly throughout the hierarchy 408.

Priors 614 are as valuable as labels whenever all of their permissible categories 504 map to the same branch choice. For example, in the tree shown in FIG. 5, if a frequent prior 614 specifies categories "504A-2, 504A-21 or 504A-22," which all map to the middle branch choice (i.e., category 504A-2) of sub-categorizer 502A, in one form of the invention, the sub-categorizer 502A uses these items as though they were labeled training cases for the middle branch. When inducing sub-categorizers 502 that consider each branch separately against its siblings jointly (e.g., Naïve Bayes), a prior that includes two branches (e.g., categories 504A-1 or 504A-3) is used in one form of the invention as a labeled training example (a negative example) when training the sub-categorizer 502A for the third branch (i.e., category 504A-2).

In one embodiment, the hierarchy of categories 408 may be restructured automatically or by hand for the purpose of yielding greater leverage of the priors 614. For example, if a prior 614 for a very large number of training items 402B specifies "A12 or A22", then the hierarchy 408 might be profitably permuted by placing these two nodes as siblings under a replacement node A1' and placing A11 and A21 into a replacement node A2'. Furthermore, portions of the hierarchy 408 might be flattened to leverage a prior 614. In this example, A1 and A2 might be eliminated to make A11, A12, A21, and A22 siblings of A3 directly under A. Items within this prior 614 may then be used as negative training cases for A11, A21 and A3. In the limit, this strategy may also be used to completely flatten the hierarchy 408 to a single root node containing all the categories as direct children.

In one embodiment, priors 614 are phrased as constraints on categories, and are used as positive or as negative training examples. For example, if a training item 402B has prior information that indicates that it is in 504A-12 or 504A-22, in one embodiment, the training item is used in the sub-categorizer 502A as a training example of "not 504A-3".

In one embodiment, priors are phrased as probabilistic constraints or information. For example, it can be specified that there is an 80% chance that item X belongs in category 504A-1 and a 20% chance that it is possibly in category 504A-3. Depending on the application and the desired set-up that is chosen, the probabilities can be required to sum up to one, indicating mutually exclusive and exhaustive categories, or more flexible category information can be used.

In one form of the invention, probabilistic information is incorporated by assigning a weight to each training item 402 that is proportional to the probability of the training item 402 being assigned to a particular category 504. For instance, a "real" labeled training item 402A for category 504A-1 gets weight 1, whereas an example that has an 80% chance of being in 504A-1 gets counted with weight 0.8.

By using probabilistic information, in one embodiment, prior information may also be used even if the categories 504 to which a training item belongs (according to the prior information) extend beyond one sub-tree. In one form of the invention, this is done by applying a threshold (e.g., if the probability "mass" exceeds 75% then count it as an example) or by using a weight as described above, or using some similar method such as using a so-called lambda vector (i.e., the possible categories for a prior are represented by fuzzy set membership information). For example, suppose a prior 614 gives a 45% probability mass to category 504A-11, 45% to category 504A-12, and 10% to category 504B-11. In one form of the invention, training items under this prior 614 are used as positive examples for category 504A-1 when training the sub-categorizer 502A, either because 90% is deemed to be "good enough" (exceeds a specified threshold), or a weight of 0.9 exceeds a specified threshold, or some similar threshold is satisfied.

In one embodiment, probabilistic information is obtained by running a large number of training items 402B with a particular prior 614 through an existing categorizer and observing the probability distribution. For example, assume that a collection of documents is received from vendor X for a document hierarchy. Using a categorizer, a distribution can be derived as to where the items in this collection belong (i.e., 32% of items from vendor X are categorized in category 504A-11). A new categorizer is then trained using this additional prior information.

The following is a pseudo-code procedure ("Train") for implementing one embodiment of inducer 306 and training set generator 410, for inducing a top-down hierarchical categorizer 308 according to one form of the present invention:

```
                    Pseudo Code Example 1    procedure Train(H,T,P,A): HC
2
3    Let S={S₁, . . . ,S_N} be the direct children of the root of H.
4
5    Let T2 be a copy of T, where the labels have been restricted to
6    the set S.
7
8    Add to T2 any training case in P where its set of allowable
9    labels falls entirely under a single node S_j.
10
11   Trivial Base Case
12   IF H contains only a single category,
13   THEN return a categorizer that always returns this single
14   category, no matter what its input feature vector.
15   (ELSE continue this procedure)
16
17   Induction Case
18   Apply the induction algorithm A to the items in the training
19   set T2 to produce a new categorizer C.
20
21   Recursion
22   for each subtree s in S {
23   Prepare H_s', T_s', and P_s' which are each restricted to the
24   subtree s.
25   Recursively call Train(H_s', T_s', R_s', A) and store the
26   result C_s for use below
27   }
28
29   return a hierarchical categorizer (HC) that
30   (1) applies the categorizer C and determines which subtree
31   s is most appropriate; and
32   (2) applies the categorizer C_s for the chosen subtree and
33   returns its result.
```

There are four inputs to the procedure Train: (1) H—a hierarchy of categories 408; (2) T—a training set (i.e., a set of feature vectors 406 that are labeled with their correct category assignment 504); (3) P—a prior training set (i.e., like the training set T, except the label information does not pinpoint a single category 504, but instead a subset of categories 504 where the feature vector 406 may belong); and (4) A—a general-purpose induction algorithm 416 (e.g., C4.5, Naïve Bayes, etc.) that, given an input training set 412, outputs a categorizer function C.

In one embodiment, parameter A is actually a pointer to a function that implements the general-purpose induction algorithm 416. In another embodiment, the algorithm A is not a parameter, but is hard-coded into the training routine. The procedure Train outputs HC, which is a trained hierarchical categorizer 308.

The procedure Train is recursive (i.e., the procedure calls itself, but typically with different parameters for each call). The initial call to the procedure Train passes input variables H, T, and P that contain information that is relevant for the whole hierarchy of categories 408 (i.e., H represents the entire hierarchy 408, and T and P represent the entire training set 412). Subsequently, in one form of the invention, when the procedure Train calls itself, the input variables H, T and P contain only the information that is pertinent to the subtree of the hierarchy 408 that the procedure is dealing with at that moment, as described in further detail below.

At line 3 of the procedure Train, the statement "Let S={S₁, . . . , S_N} be the direct children of the root of H" indicates that the set of top-level choices in the hierarchy 408 are assigned to S₁, S₂, . . . , S_N. For the example hierarchy shown in FIG. 5, there are two children of the root 500, so N=2, and S₁ represents category 504A, and S₂ represents category 504B.

At lines 5–6 of the procedure Train, the statement "Let T2 be a copy of T, where the labels have been restricted to set S" indicates that T2 represents a transformed version of the training set 412, where all of the labels for categories 504 below the set S (i.e., below categories 504A and 504B) are re-mapped to labels for their ancestor categories 504 within the set S. For example, if an item were labeled $S_{2/1/2}$, which corresponds to category 504B-12 in the embodiment of FIG. 5 (i.e., $S_2$ corresponds to category 504B, $S_{2/1}$ corresponds to the first category under $S_2$ or category 504B-1, and $S_{2/1/2}$ corresponds to the second category under $S_{2/1}$ or category 504B-12), its transformed label would be its ancestor in the set S ($S_2$ in this example), which corresponds to category 504B. Thus, using the embodiment illustrated in FIG. 5, the training set T2 includes two possible labels—a first label for category 504A and a second label for category 504B.

At lines 8–9 of the procedure Train is the statement "Add to T2 any training case in P where its set of allowable labels falls entirely under a single node $S_j$." For the first call to the procedure Train, the set S includes $S_1$ (i.e., category 504A) and $S_2$ (i.e., category 504B). Thus, any training case in P that has a set of allowable labels that falls entirely under either the subtree at category 504A or the subtree at category 504B is added to T2. Such cases are as good as labeled training cases for $S_1$ and $S_2$. In one embodiment, items whose set of allowable labels falls under multiple nodes $S_j$ are excluded from T2. In this embodiment, if a training case in P has a set of allowable labels that falls somewhere under both categories 504A and 504B, the training case is excluded from T2. For example, if a prior 614 indicates that the training item could be in category 504A-1, category 504B-11, or category 504B-12, that training item is not useful in deciding between category 504A or 504B and is excluded.

Lines 11–15 of the procedure Train handle a trivial base case. As indicated therein, if the hierarchy of categories, H, contains a single category 504, then the procedure returns a trivial categorizer that always returns this single category 504, no matter what its input feature vector. If H contains more than one category 504, then the procedure continues.

Lines 17–19 of the procedure Train handle an induction case. As indicated therein, the induction algorithm A is applied to the items in the training set T2 to produce a new categorizer C. If all the items in T2 fall under a single branch, then the induction algorithm A need not be run and C is the trivial classifier that selects the single populated branch. The new categorizer will be used at categorization time to select the next branch in the top-down decision process. For the example illustrated in FIG. 5, the new categorizer C will be used as the root categorizer 500 to select between categories 504A and 504B.

Lines 21–26 of the procedure Train specify a recursion process. For each subtree s in S, the procedure prepares $H_s'$, $T_s'$, and $P_s'$ which are each restricted to the subtree s, recursively calls itself with the inputs $H_s'$, $T_s'$, $R_s'$, and A, and stores a resulting sub-categorizer, $C_s$. In one embodiment, any training item in P that has a set of allowable labels that falls into multiple subtrees s is excluded from P'. For the embodiment illustrated in FIG. 5, for each of the two subtrees $S_1$ and $S_2$ (i.e., the subtrees at categories 504A and 504B) the procedure Train would be called to induce the sub-categorizers 502 at those subtrees (i.e., sub-categorizers 502A and 502B).

At lines 29–33 of the procedure Train, a hierarchical categorizer (HC) 308 is returned. In one embodiment, the hierarchical categorizer 308 does the following: (1) applies the categorizer C and determines which subtree s is most appropriate; and (2) applies the categorizer $C_s$ for the chosen subtree and returns its result.

In one embodiment, additional recursive calls to the procedure Train are made to induce further sub-categorizers 502 for additional levels in the hierarchy (e.g., sub-categorizers 502A-1, 502A-2, 502A-3, 502B-1, and 502B-2).

The above pseudo code example for the procedure Train is provided to illustrate one embodiment of inducer 306 and training set generator 410. It will be readily apparent to persons of ordinary skill in the art that various modifications and additions may be made for alternative embodiments. As one example, rather than passing a parameter A (i.e., a pointer to the general purpose induction algorithm 416) to the procedure Train, in an alternative embodiment, the code for the induction algorithm 416 is included in a subroutine.

Figure 7:
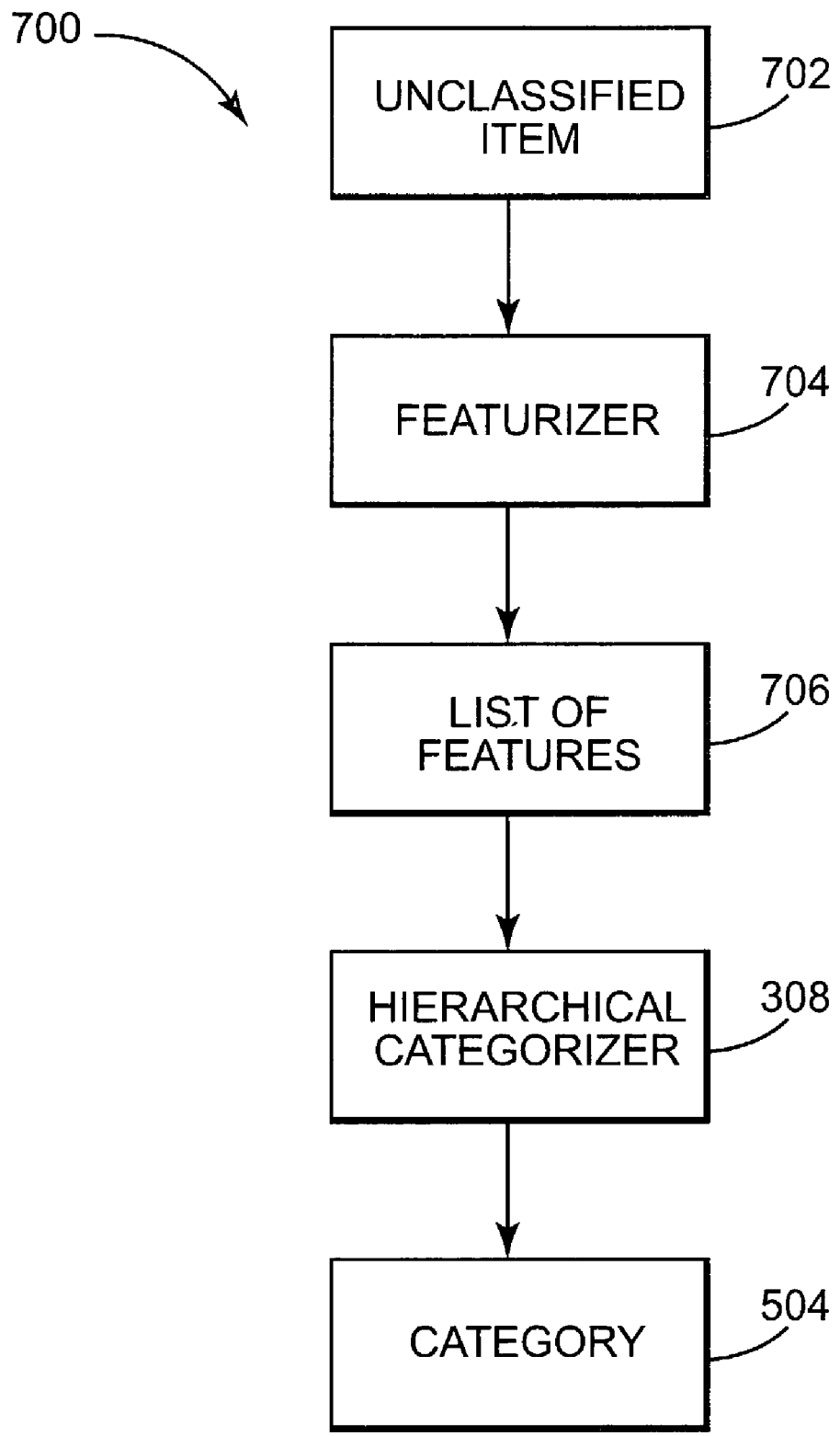
FIG. 7 is a block diagram illustrating a hierarchical categorization system according to one embodiment of the present invention.

After top-down hierarchical categorizer 308 has been trained, it is ready to classify new, unlabeled items. FIG. 7 is a block diagram illustrating a hierarchical categorization system 700 according to one embodiment of the present invention. System 700 includes unclassified item 702, featurizer 704, list of features 706, hierarchical categorizer 308, and category 504.

The categorization process starts with an unclassified item 702 that is to be categorized, such as a raw document. The unclassified item 702 is provided to featurizer 704. Featurizer 704 extracts features from the unclassified item 702, such as whether a word 1 was present and a word 2 was absent, or the word 1 occurred five times and the word 2 did not occur at all. The features from the featurizer 704 are used to create a list of features 706. The list of features 706 is provided to hierarchical categorizer 308, which selects the best category 504 for item 702 based on the provided list of features 706.

During training of hierarchical categorizer 308 according to one embodiment, a set of features is associated with each of the categories 504. The term "level of goodness" is used herein to describe how good the fit is between the list of features 706 of a document 702 to be categorized and the previously determined features of a category 504. There are many different ways of determining level of goodness, such as Naïve Bayes, C4.5, Bayesian networks, rule-based multi-category categorizers that output some level of goodness, conditional probability statements, or simple heuristics, among others, or a combination of the foregoing.

In one embodiment, root categorizer 500 of hierarchical categorizer 308 computes for item 702 a level of goodness of the match between the item 702 and the categories 504A and 504B, and then applies a decision criterion for determining whether the level of goodness is high enough to assign the item 702 to one of these categories 504A or 504B. Similarly, each sub-categorizer 502 that is assigned the item 702 computes a level of goodness of the match between the item 702 and the categories 504 under that sub-categorizer 502, and applies a decision criterion for determining whether the degree of goodness is high enough to assign the document to one of these categories 504. This process is repeated deeper into the hierarchy until a final, correct category 504 is identified.

Priors have been used before in a couple of different categorization techniques. In a first technique, the overall categorization problem has been broken up into sub-problems based on a prior, and then machine learning has separately been applied to each sub-problem. The machine learning algorithm itself does not use the prior information, but rather relies on labeled training items for each of the sub-problems. This technique effectively makes a composite categorizer that depends foremost on the prior attribute.

As a potential example of this technique, consider the many Internet directories, such as Yahoo (http://www.yahoo.com) and Infoseek (http://www.infoseek.com) that are largely manually organized in preset hierarchies. For shopping web sites, such as Yahoo shopping, there can be thousands or hundreds of thousands of different products from thousands of different stores. For such sites, rather than manually placing each product into a category within the hierarchy, people typically write textual queries to sort out the various products and identify categories for each product. To further simplify the categorization process, the web site may require companies to identify a top-level category that the company's products fall under. For example, for the hierarchy shown in FIG. 5, the web site may require companies to identify whether its products fall under category 504A or 504B (e.g., electronics or gardening supplies). In this way, the categorization problem is broken up into two separate problems. Machine learning (or human authored rules) could be used for one tree (under category 504A) and could also be used for the second tree (under category 504B), but would not be used at the root 500. The information provided by each company is a "prior" as it identifies a set of categories that the product falls under, but it does not identify exactly which category the product falls under.

This first technique has several disadvantages. One disadvantage is that the technique depends on the priors being disjoint, which is not always the case. For example, some book publishers produce only non-fiction, and other publishers produce only non-fiction technical material (a smaller set of topics under the non-fiction topic). Thus, priors having different granularities may be provided, but the more specific prior information is not leveraged in the first technique. The additional information that the non-fiction material produced by certain publishers is always technical material is not used in the first technique.

A second disadvantage of the first technique is that there is often some non-zero cost associated with obtaining a prior, which one is typically willing to pay for training, but is not typically willing to pay for every future use of the trained categorizer. In other words, using the first technique, even after the categorizer has been trained, priors must be obtained for each and every item to be categorized, so that it can be assigned to the appropriate branch in the hierarchy for further categorization. Obtaining these priors has an associated cost.

A third disadvantage of the first technique is that priors may not be available on many incoming cases to be categorized.

A second categorization technique that uses priors treats a prior as a predictive feature for every case. Thus, for each training case, the prior is included as an additional feature. This technique carries the second and the third disadvantages described above. Regarding the second disadvantage, since the prior is used as a predictive feature, it is important to have the prior at categorization time. And it may be costly to continually have to obtain this prior information for every case that needs to be categorized in the future. Regarding the third disadvantage, if the prior is not available at categorization time, the prior could be treated as a missing value. However, the induced categorizer might have learned to depend heavily on that attribute, and accuracy will suffer if the missing attribute is treated with standard missing-value techniques (e.g., filling it in with the majority value or most likely value given the other attributes).

Embodiments of the present invention do not have the disadvantages associated with the above-described previous techniques for using prior information. In one embodiment, prior information need not be supplied for every training case. One embodiment of the present invention uses priors essentially as labels during training, and then the prior information is not needed during later categorization of unlabeled documents. In one embodiment, priors are used during training of a hierarchical top-down categorizer to increase the amount of training information for the categorizer, and thereby increase the categorization accuracy of the categorizer with relatively minor added cost. In many situations, various priors are freely available, but labels are costlier to obtain. In one embodiment, the use of prior information in training a top-down hierarchical categorization system reduces the amount of labeled training data that is needed for the system. In one embodiment, if the priors are available during classification (not just at training), they may be used to restrict the eligible categories for classification, eliminating some erroneous categories from consideration.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer-implemented method for inducing a top-down hierarchical categorizer, comprising:
   providing a set of labeled training items, each labeled training item including an associated label representing a single category assignment for the training item;
   providing a set of unlabeled training items;
   associating a prior with the set of unlabeled training items that is independent of any particular feature contained in the unlabeled training items, the prior representing a plurality of possible category assignments for the set of unlabeled training items; and
   inducing a top-down hierarchical categorizer with a machine learning algorithm based on the set of labeled training items, the set of unlabeled training items, and the prior.

2. The method of claim 1, wherein the step of inducing a top-down hierarchical categorizer comprises:
   determining whether the possible category assignments for the set of unlabeled training items all map to a single category; and
   using the sot of unlabeled training items as training examples for the single category.

3. The method of claim 1, wherein the unlabeled training items are used as positive training examples for a category.

4. The method of claim 1, wherein the unlabeled training items are used as negative training examples for a category.

5. The method of claim 1, wherein the prior comprises probabilistic information.

6. The method of claim 5, wherein the probabilistic information represents a probability for each of the possible category assignments that the unlabeled training items fall under that category.

7. The method of claim 1, wherein the machine learning algorithm is selected from the group consisting of: Naïve Bayes, Support Vector Machines, k-Nearest Neighbors, Neural Networks, and C4.5.

8. A computer-implemented system for inducing a top-down hierarchical categorizer based on labeled training items and unlabeled training items, each labeled training item including a plurality of features and a label identifying a single category assignment, each unlabeled training item including a plurality of features and prior information representing a plurality of possible category assignments for the unlabeled training item, the system comprising:
   a plurality of categories organized in a hierarchy of categories; and an inducer for inducing a plurality of categorizers corresponding to the plurality of categories, the inducer configured to induce each categorizer based on the features of labeled training items assigned to categories under that categorizer and based on the features of unlabeled training items with prior information representing category assignments that map to a category under that categorizer.

9. The system of claim 8, wherein the unlabeled training items are used as positive training examples for at least one of the categories in the hierarchy of categories.

10. The system of claim 8, wherein the unlabeled training items are used as negative training examples for at least one of the categories in the hierarchy of categories.

11. The system of claim 8, wherein the prior information for each unlabeled training item comprises probabilistic information.

12. The system of claim 11, wherein the probabilistic information for each unlabeled training item represents a probability for each of the possible category assignments that the unlabeled training item falls under that category.

13. The system of claim 8, wherein the inducer induces the plurality of categorizers based on a general-purpose induction algorithm.

14. The system of claim 13, wherein the general-purpose induction algorithm is selected from the group consisting of Naïve Bayes, Support Vector Machines, k-Nearest Neighbors, Neural Networks, and C4.5.

15. A computer-implemented system for inducing a top-down hierarchical categorizer from a set of labeled training items and a set of unlabeled training items, each labeled training item including an associated label representing a single category assignment for the training item, the system comprising:
- means for associating a prior with each unlabeled training item that is independent of any particular feature contained in the unlabeled training item, the prior representing a plurality of possible category assignments for the unlabeled training item; and
- means for inducing a plurality of categorizers based on a machine learning algorithm, the set of labeled training items, the set of unlabeled training items, and the priors associated with the unlabeled training items, the plurality of categorizers including a root categorizer and a plurality of sub-categorizers organized in a tree structure.

16. The system of claim 15, wherein the means for inducing comprises:
- means for determining whether the possible category assignments for a first prior all map to a common category; and
- using the training item associated with the first prior as a training example for the common category.

17. The system of claim 15, wherein at least one of the unlabeled training items is used as a positive training example for a category.

18. The system of claim 15, wherein at least one of the unlabeled training items is used as a negative training example for a category.

19. The system of claim 15, wherein at least one of the priors comprises probabilistic information.

20. The system of claim 19, wherein the probabilistic information includes a probability for each of the possible category assignments that the unlabeled training item falls under that category.

21. The system of claim 15, wherein the machine learning algorithm is selected from the group consisting of Naïve Bayes, Support Vector Machines, k-Nearest Neighbors, Neural Networks, and C4.S.

22. A computer-readable medium having computer-executable instructions for performing a method of inducing a top-down hierarchical categorizer based on labeled training items and unlabeled training items, each labeled training item including a label identifying a single category assignment, each unlabeled training item including prior information representing a plurality of possible category assignments for the unlabeled training item, the method comprising:
- providing a plurality of categories organized in a hierarchy of categories; inducing a plurality of categorizers corresponding to the plurality of categories; and
- associating a set of features with each category based on features of labeled training items assigned to that category and based on features of unlabeled training items with prior information representing category assignments that map to that category.

23. The computer-readable medium of claim 22, wherein the method further comprises:
- using the unlabeled training items as positive training examples for at least one of the categories in the hierarchy of categories.

24. The computer-readable medium of claim 22, wherein the method further comprises:
- using the unlabeled training items as negative training examples for at least one of the categories in the hierarchy of categories.

25. The computer-readable medium of claim 22, wherein the prior information for at least one unlabeled training item comprises probabilistic information.

26. The computer-readable medium of claim 25, wherein the probabilistic information represents a probability for each of the possible category assignments that the unlabeled training item falls under that category.

27. The computer-readable medium of claim 22, wherein the step of inducing a plurality of categorizers further comprises:
- inducing a plurality of categorizers corresponding to the plurality of categories based on a general-purpose induction algorithm.

28. The computer-readable medium of claim 27, wherein the general-purpose induction algorithm is selected from the group consisting of Naïve Bayes, Support Vector Machines, k-Nearest Neighbors, Neural Networks, and C4.5.

29. The computer-readable medium of claim 22, wherein the method further comprises:
- restructuring the hierarchy of categories based on the prior information.

* * * * *